T. Newman, Railway Switch.

117198

PATENTED JUL 18 1871

Witnesses:

Inventor:
T. Newman
PER
Munn & Co.
Attorneys.

UNITED STATES PATENT OFFICE.

THOMAS NEWMAN, OF NEW ORLEANS, LOUISIANA.

IMPROVEMENT IN RAILWAY SWITCHES.

Specification forming part of Letters Patent No. 117,198, dated July 18, 1871.

*To all whom it may concern:*

Be it known that I, THOMAS NEWMAN, of New Orleans, in the parish of Orleans and State of Louisiana, have invented a new and Improved Switch; and I do hereby declare that the following is a full, clear, and exact description thereof, which will enable others skilled in the art to make and use the same, reference being had to the accompanying drawing forming part of this specification.

This invention is intended chiefly for street or horse railroads; and consists in the combination of an oscillating platform with a movable frog or switch, the platform being arranged within a railroad track so that it can be operated by the weight of the horses or other animals, thereby moving the switch from one track to another, as hereinafter described.

Figure 1:
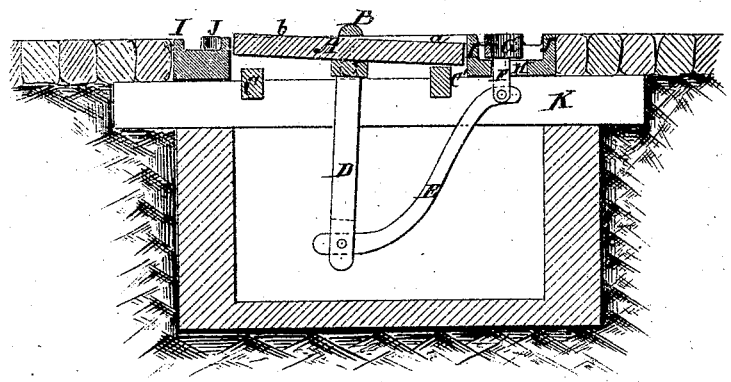
Figure 2:
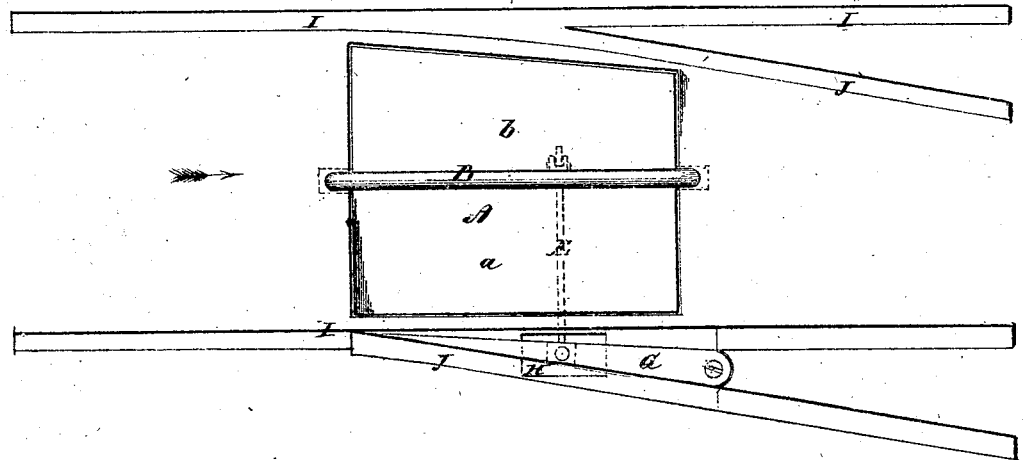

Figure 1 is a cross-sectional elevation of my improvement through the line $x\,x$ in Fig. 2. Fig. 2 is a plan view of my improved switch.

Similar letters of reference indicate corresponding parts.

In the drawing, A represents a pivoted rocking platform placed over a pit or cavity between the two tracks of a railroad, secured in place by the surface-bar B, the edges of the platform being supported and its oscillation governed by beams C which rest on cross-beams K, as shown. The platform is centrally supported on an oscillating beam, L, the extremities of which oscillate in journals in the cross-beams K. From the beam L depends an arm, D, having a connecting rod, E, attached by a pivot, which rod is also pivoted to an arm, F, depending from the under side of the frog G below the rail I, as shown. When a horse-car approaches the platform in the direction of the arrow the animals are turned so as to travel across that side of the platform next to the switch G, when the weight of the animals causes the platform to sink or oscillate, thereby shifting the switch to the position shown in Fig. 2. If the weight of the animal is thrown upon the other side of the platform the switch will be opened, leaving the track I clear. In this manner, by simply directing the weight of the animals upon the proper side of the platform, the switch is operated and held in the desired direction.

I do not limit or confine myself to the exact form of the parts herein described, as it may be varied without departing from my invention.

Having thus described my invention, I claim as new and desire to secure by Letters Patent—

The combination of an oscillating platform, arranged for operation, by the weight of the draft animals of the car, with a switch, in the manner substantially as herein shown and described.

THOMAS NEWMAN.

Witnesses:
F. G. FISK,
WM. P. HOOVER.